(12) United States Patent
McClenahan

(10) Patent No.: US 6,600,555 B2
(45) Date of Patent: Jul. 29, 2003

(54) APPARATUS AND METHOD FOR TARGET IDENTIFICATION IN A VEHICLE WHEEL ALIGNMENT SYSTEM

(75) Inventor: James W. McClenahan, St. Louis, MO (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 09/977,850

(22) Filed: Oct. 15, 2001

(65) Prior Publication Data

US 2003/0071989 A1 Apr. 17, 2003

(51) Int. Cl.$^7$ .......................... G01C 1/00; G01B 11/26; G05B 19/18
(52) U.S. Cl. .................. 356/139.09; 33/203.18; 700/59
(58) Field of Search ............... 356/139.09; 33/213.18, 33/288; 700/279, 59

(56) References Cited

U.S. PATENT DOCUMENTS

| | | | |
|---|---|---|---|
| 4,672,562 A | * | 6/1987 | Egli et al. |
| 4,672,564 A | * | 6/1987 | Egli et al. |
| 5,489,983 A | | 2/1996 | McClenahan et al. ... 356/139.09 |
| 5,519,489 A | | 5/1996 | McClenahan et al. ... 356/139.09 |
| 5,589,927 A | * | 12/1996 | Corghi ................ 356/139.09 |
| 6,134,792 A | | 10/2000 | January ................ 33/203.18 |
| 6,148,528 A | | 11/2000 | Jackson ................... 33/288 |
| 6,252,973 B1 | | 6/2001 | January et al. ........... 382/100 |
| 6,313,911 B1 | * | 11/2001 | Stieff ................ 356/139.09 |

OTHER PUBLICATIONS

Computer and Robot Vision, vol. II, Robert M. Haralick, Linda G. Shapiro; Prentice Hall, 1993 (pp. 101–103).

* cited by examiner

Primary Examiner—Stephen C. Buczinski
(74) Attorney, Agent, or Firm—Thompson Coburn LLP; Gregory E. Upchurch; Caroline G. Chicoine

(57) ABSTRACT

A system for target identification in a vehicle wheel alignment system includes first and second units. A target with at least four collinear reference points is attached to the first unit, and an image sensor is attached to the second unit. The collinear reference points have at least one known cross-ratio, and the image sensor has an imaging element that produces an image data-set to capture an image of the target. The system also includes a processor for identifying image points within the image data-set and for calculating vehicle wheel alignment information using the image data that corresponds to the target. To identify the image data corresponding to the target, the processor computes a series of cross-ratios for sets of four points within the image data-set and rejects noise points by comparing the cross-ratios to the known cross-ratio.

30 Claims, 2 Drawing Sheets

APPARATUS AND METHOD FOR TARGET IDENTIFICATION IN A VEHICLE WHEEL ALIGNMENT SYSTEM

CROSS-REFERENCE TO RELATED APPLICATIONS

Not Applicable

STATEMENT REGARDING FEDERALLY SPONSORED RESEARCH OR DEVELOPMENT

Not Applicable.

BACKGROUND OF THE INVENTION

1. Field of the Invention

The present invention relates generally to vehicle wheel alignment systems. More specifically, the present invention relates to the identification of a target in vehicle wheel alignment systems.

2. Description of Related Art

Proper alignment of wheels in a vehicle is important for proper handling of the vehicle and proper tire wear. The alignment of a vehicle's wheels is performed primarily by adjusting camber, caster, steering axis inclination, and toe. Other suspension problems may be detected by examining ride height and wheel offset distances. Some of these alignment measurements may also require determination of vehicle distances such as wheelbase and track width.

It is known that alignment angles may be measured by placing sensor heads on each wheel of the vehicle to form pairs that extend across the front and/or rear of the vehicle, along each side of the vehicle, and even diagonally across the vehicle. Each pair of sensor heads includes an emitter on one sensor head that, as an active target, can actively emit radiation and an image sensor at the other sensor head of the pair. The emitter is a radiating source that transmits a signal to the image sensor of the other sensor head. The image sensor converts this signal into a value that is related to alignment angle of the wheel. It is generally known to emit radiation beams in the electromagnetic spectrum at the visual or infrared wavelengths. It is also known that different types of sensors can be used in the receivers, including a linear array charged coupled device (CCD), as set forth in U.S. Pat. No. 5,489,983. It is also known that, to obtain accurate measurements, alignment systems must be able to distinguish the transmitted signal from background and scattered radiation when both are present in the signal that is received by the image sensor.

To solve the problem of background and scattered radiation, it is known for a linear CCD to capture one image when the radiating source is transmitting (on state) and to capture another image when the radiated source is not transmitting (off-state). The difference between the two images is the radiating source of interest, or the active target. Accordingly, alignment systems subtract the off-state image from the on-state image to identify the signal from the emitter. However, this on-state/off-state capture cycle for the subtraction process lengthens the time needed to conduct a vehicle wheel alignment because it necessitates the capture of two images per measurement. Additionally, the CCD image capture must be synchronized with the on-state and off-state of the radiating source. Furthermore, only one target can be identified for each on-state/off-state capture cycle, further increasing the time necessary to conduct a vehicle wheel alignment if there is a desire to identify and differentiate between multiple targets.

BRIEF SUMMARY OF THE INVENTION

It is in view of the above problems that the present invention was developed. The present invention is an apparatus and method for identifying a particular target in a vehicle wheel alignment system. The vehicle wheel alignment system includes first and second units that can be attached to a pair of wheels or to a wheel and a trailer kingpin. A target containing reference points is attached to the first unit, and an image sensor containing an imaging element is attached to the second unit. The imaging element receives an image of the target and produces corresponding image data. A processor in the system identifies the image points in the image data that correspond to the reference points, and the processor calculates vehicle wheel alignment information using the image points. The reference points are preferably at least four in number and substantially collinear, having at least one known cross-ratio. The imaging element is preferably a linear CCD array that captures an image of the target, producing image data. To identify the image data corresponding to the target, the processor preferably computes a series of cross-ratios for sets of four points within the captured image and compares the cross-ratios to the known cross-ratio.

It is an advantage of the present invention to provide a target identification system in a vehicle alignment system that identifies image data corresponding to a target without using an on-state/off-state capture cycle or a subtraction process.

It is a further advantage of the present invention to provide a target identification system in a vehicle alignment system without synchronizing multiple image sensors.

It is yet another advantage of the present invention to provide a target identification system in a vehicle alignment system that identifies the target with improved accuracy.

It is still another advantage of the present invention to provide a target identification system in a vehicle alignment system that identifies multiple targets using a linear array detector with a single image capture.

Further features and advantages of the present invention will be apparent from the description below with reference to the accompanying drawings in which like numbers indicate like elements.

DETAILED DESCRIPTION OF THE INVENTION

Figure 1:
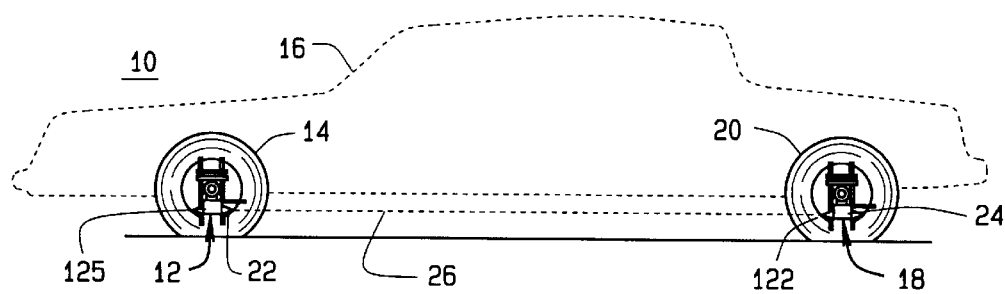
FIG. 1 is a side view of a vehicle with a vehicle wheel alignment system attached to its wheels.
Figure 2:
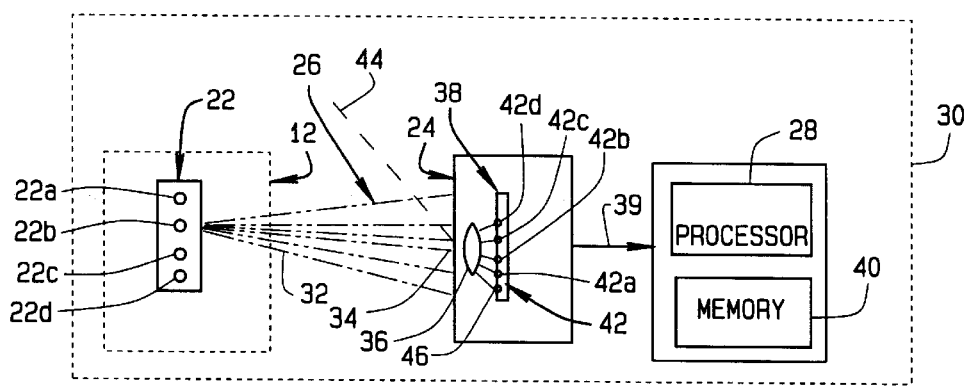
FIG. 2 is a block diagram of the vehicle wheel alignment system of FIG. 1.

As illustrated by FIG. 1, a system for identifying a target in a vehicle wheel alignment system 10 generally includes a first unit 12 for attachment to a first wheel 14 of a vehicle 16 and a second unit 18 for attachment to a second wheel 20 of vehicle 16. A target 22 is attached to first unit 12, and an image sensor 24 is attached to second unit 18 such that the target 22 is in a line of sight 26 of the image sensor 24. The target 22 has a set of reference points 22a, 22b, 22c, and 22d (FIG. 2). Image sensor 24 preferably has a linear CCD array and the reference points 22a, 22b, 22c, and 22d are preferably radiation emitters, such as described in U.S. Pat. Nos. 5,489,983 and 5,519,489 to McClenahan, et. al. The image sensor 24 could alternatively use a CMOS detector or other similar device.

As shown in the block diagram of FIG. 2, in addition to the target 22 and image sensor 24, the vehicle wheel alignment system 10 includes a processor 28. The target 22, image sensor 24, and processor 28 are the operational elements of a target identification subsystem 30 in the vehicle alignment system 10. Image sensor 24 is in the line of sight 26 of target 22 such that radiation beams 32 from the target 22 enter the image sensor through an aperture 34 and may also pass through a lens 36. Image sensor 24 has an imaging element 38, such as the preferred linear CCD array, that captures an image of the target 22. The imaging element 38 receives the radiation beams 32 and produces a set of image data 42, generally referred to herein as an image data-set 42. The image data-set 42 includes image points 42a, 42b, 42c, and 42d that respectively correspond to the reference points 22a, 22b, 22c, and 22d. The processor 28 is operatively connected to the image sensor 24, such as through a data link 39, and receives the image data-set therefrom.

The set of reference points 22a, 22b, 22c, and 22d have a known geometric relationship, and the processor 28 contains information about their known geometric relationship. The processor 28 uses the geometric information to identify the corresponding image points 42a, 42b, 42c, and 42d in the image data-set 42. The processor 28 can identify the image points and calculate the vehicle wheel alignment information using the same image data-set 42 initially received by the imaging element 38, without any on-state/of-state capture cycle. Vehicle wheel alignment information will typically be alignment angles, and it is also known that distances can also be measured, such as disclosed in U.S. Pat. Nos. 5,489,983 and 5,519,489 to McClenahan, et. al.

In the preferred embodiment, the reference points 22a, 22b, 22c, and 22d are at least four in number and are substantially collinear, having sufficient collinearity that at least one corresponding cross-ratio can be determined therefrom. Accordingly, in the preferred embodiment, the reference points 22a, 22b, 22c, and 22d are known to be substantially collinear, and the cross-ratio of the reference points 22a, 22b, 22c, and 22d is the geometric relationship that is known by the processor 28. The known cross-ratio can be stored in a memory 40 of the processor 28 or can otherwise be entered into or accessed by the processor 28. Exact collinearity of the reference points 22a, 22b, 22c, and 22d is not required. For example, without exact collinearity, corrections can be calculated such that the reference points 22a, 22b, 22c, and 22d are mathematically equivalent to being collinear and a cross-ratio can be determined therefrom. Generally, the reference points 22a, 22b, 22c, and 22d must have sufficient collinearity for the processor 28 to compute a cross-ratio for the four image points 42a, 42b, 42c, and 42d that corresponds to the known cross-ratio.

Generally, the cross-ratio for any set of four collinear reference points 22a, 22b, 22c, and 22d is $$\frac{(a-b)(c-d)}{(a-c)(b-d)},$$

where the linear locations of the four substantially collinear reference points 22a, 22b, 22c, and 22d are respectively denoted a, b, c, and d. The locations of the reference points 22a, 22b, 22c, and 22d can be measured on target 22 to determine their cross-ratio. The cross-ratio of the reference points 22a, 22b, 22c, and 22d can also be calculated during a calibration run. In the calibration run, the image points 42a, 42b, 42c, and 42d have linear values (42a, 42b, 42c, 42d) that respectively correspond to their position on the imaging element 38, and equation (1) is used to calculate their cross-ratio.

$$\text{Cross-Ratio} = \frac{(42a-42b)(42c-42d)}{(42a-42c)(42b-42d)} \quad (1)$$

During alignment operations, it is likely that background and scattered radiation 44 will also be present in addition to the radiation beams 32. For example, background and scattered radiation 44 could be produced by ambient light sources or by radiation beams 32 reflecting off of vehicle 16, respectively. Therefore, the imaging element 38 will likely produce an image data-set 42 that includes noise points 46 in addition to the four image points 42a, 42b, 42c, and 42d. Therefore, according to the following process, the processor 28 preferably computes a series of cross-ratios, rejecting the noise points 46 while identifying the four image points 42a, 42b, 42c, and 42d.

The processor 28 selects a set of four image points from the image data-set 42, which may or may not include noise points 46. Using equation (1), the processor 28 next calculates a cross-ratio for the selected set of image points and compares the calculated cross-ratio to the known cross-ratio. If the calculated cross-ratio corresponds to the known cross-ratio, the selected set of image points are identified as the four image points 42a, 42b, 42c, and 42d that correspond to the four collinear reference points 22a, 22b, 22c, and 22d, thereby identifying the portion of the image data-set 42 that corresponds to the target 22. If the calculated cross-ratio does not correspond to the known cross-ratio, such as would be the case if the cross-ratio was calculated for noise point 46 with image points 42a, 42b, 42c, the processor 28 repeats the selection, calculation, and comparison for different sets of four image points until the calculated cross-ratio corresponds to the known cross-ratio. According to the present invention, the values for calculated cross-ratio and the known cross-ratio can be within a defined range of each other for correspondence so that exact equality of the values is not necessary. Similarly, exact equality of the cross-ratio equation is not necessary because slight modifications to the cross-ratio equation can also yield results within an acceptable range.

Once the four image points 42a, 42b, 42c, and 42d that correspond to the four collinear reference points 22a, 22b, 22c, and 22d are identified, all noise points 46 in the image data-set 42 can be rejected. The entire process is accomplished during one image acquisition cycle of the imaging element 38 without the need for an on-state/off-state capture cycle for the subtraction process or synchronization of image sensor 24 with the on-state and off-state of reference points 22. Since there is no need for an on-state/off-state capture cycle or for synchronization of image sensors 24 with respect to the on-state and off-state of reference points 22, update rates for the present invention are faster than existing methods of computing vehicle wheel alignment information.

During a calibration run, the processor 28 follows a process that is similar to its process during alignment operations. However, the processor 28 does not need to perform the iterative steps during the calibration run because, as a part of the calibration process, the calibration run is performed in a controlled environment. For the calibration run, the controlled environment eliminates noise points 46 by limiting the amount of background and scattered radiation that reaches the imaging element 38 and only the radiation beams 32 from the target 22 are directed toward the imaging element 38. Accordingly, the four image points 42a, 42b, 42c, and 42d are the only set of data captured by the processor 28 during the calibration run, i.e., an image data-set 42 substantially without any noise points noise points 46. The corresponding cross-ratio is calculated using equation (1) and is preferably stored within the processor 28 as the known cross-ratio to complete the calibration run.

As described above, in the preferred embodiment, the target 22 actively emits radiation beams 32 from each of the reference points 22a, 22b, 22c, and 22d. Alternatively, the target 22 could passively reflect radiation beams 32 from each of the reference points 22a, 22b, 22c, and 22d. For a target 22 that is reflective, the reference points 22a, 22b, 22c, and 22d could be positive target elements, being reflective on a non-reflecting background, or negative target elements, being non-reflective on a reflective background.

Also in the preferred embodiment, the imaging element 38 is a linear CCD array. Alternatively, the imaging element 38 could be a two-dimensional array. Additionally, if the imaging element 38 is an integrated circuit detector array, such as in a CMOS detector, the processor 28 can be integrally formed with the imaging element 38. For a two-dimensional array, the processor 28 can limit each set of selected points to only collinear points on the imaging element 38 while continuing to use the cross-ratio, equation (1), as the geometric relationship used to identify the target. Alternatively, when receiving image data from a two-dimensional array, the processor 28 is not limited to identifying the target 22 using the cross-ratio of collinear points and could identify the target 22 based on other geometric relationships. Generally, geometric relationships depend upon particular geometric configurations that are selected for target reference points. Other geometric configurations will have different geometric relationships, as exemplified by U.S. Pat. Nos. 6,134,792, 6,148,528, and 6,252,973.

Figure 3:
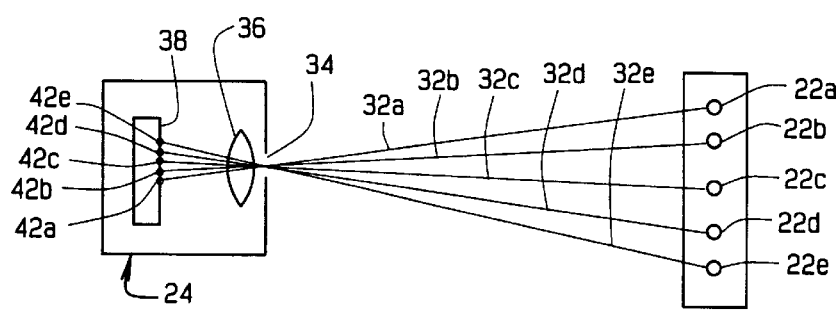
FIG. 3 is a diagram showing the five collinear reference points of the target of FIG. 1.

The present invention also contemplates the use of additional collinear points in combination with the four collinear reference points 22a, 22b, 22c, 22d. Using more than four collinear reference points improves the accuracy of the target identification subsystem. For example, FIG. 3 illustrates a preferred embodiment of the invention having a target identification subsystem with five collinear reference points 22a, 22b, 22c, 22d, and 22e. The reference points 22a, 22b, 22c, 22d, and 22e emit (or reflect) respective radiation beams 32a, 32b, 32c, 32d, and 32e towards image sensor 24, resulting in five image points 42a, 42b, 42c, 42c, and 42e. Each cross-ratio requires the use of four reference points, so if there are five radiation emitters, there would be five different cross-ratios. For a target with five emitters, the first cross-ratio is computed according to equation (1) above, and the equations for the remaining four cross-ratios are set forth below.

$$\text{Cross-Ratio } 2 = \frac{(42a - 42b)(42c - 42e)}{(42a - 42c)(42b - 42e)} \tag{2}$$

$$\text{Cross-Ratio } 3 = \frac{(42a - 42b)(42d - 42e)}{(42a - 42d)(42b - 42e)} \tag{3}$$

$$\text{Cross-Ratio } 4 = \frac{(42a - 42c)(42d - 42e)}{(42a - 42d)(42c - 42e)} \tag{4}$$

$$\text{Cross-Ratio } 5 = \frac{(42b - 42c)(42d - 42e)}{(42b - 42d)(42c - 42e)} \tag{5}$$

Similarly, for a target 22 having more than five collinear reference points, additional sets of four reference points 22 can be used to form additional cross-ratios.

For the preferred embodiment, the particular order of the five (5) computed cross-ratios is also compared to the order of the five (5) reference points' cross-ratios. By comparing the order of the cross-ratios, the target identification subsystem can ensure that a reflection of the target does not cause a false identification. Therefore, this additional comparison further improves the accuracy of the system when substantially perfect reflections are present.

Where more than four collinear reference points are employed on the target 22, the additional calibration cross-ratios can also be calculated during the calibration process. Additional calibration cross-ratios provide redundancy in identifying the five image points 42a, 42b, 42c, 42c, and 42e, thereby improving accuracy in identifying the portion of the image data-set 42 corresponding to the target 22.

Returning to FIG. 1, a second target 122 can be attached to the second unit 18 and a second image sensor 125 can be attached to the first unit 12. The second target 122 is substantially similar to the first target 22 and has a second set of collinear reference points. The second image sensor 125 is substantially similar to the first image sensor 24. Preferably, the first image sensor 24 is attached to the second unit 18 and the second image sensor 125 is attached to the first unit 12.

It will also be appreciated that the inventive target identification subsystem and its inventive identification process described above allows the processor 28 to differentiate multiple targets having different cross-ratios within the same image data-set 42. When two targets have different cross-ratios, the processor 28 can identify both targets and differentiate one target from the other target based on the different cross-ratios. Only one image of the two targets, in the same line of sight 26 of the image sensor, would need to be captured for the processor 28 to identify both targets and differentiate them. The targets do not have to use different on-states, different emitter frequencies, or different reflection characteristics because the differences in their cross-ratios is sufficient to distinguish the targets.

Figure 4:
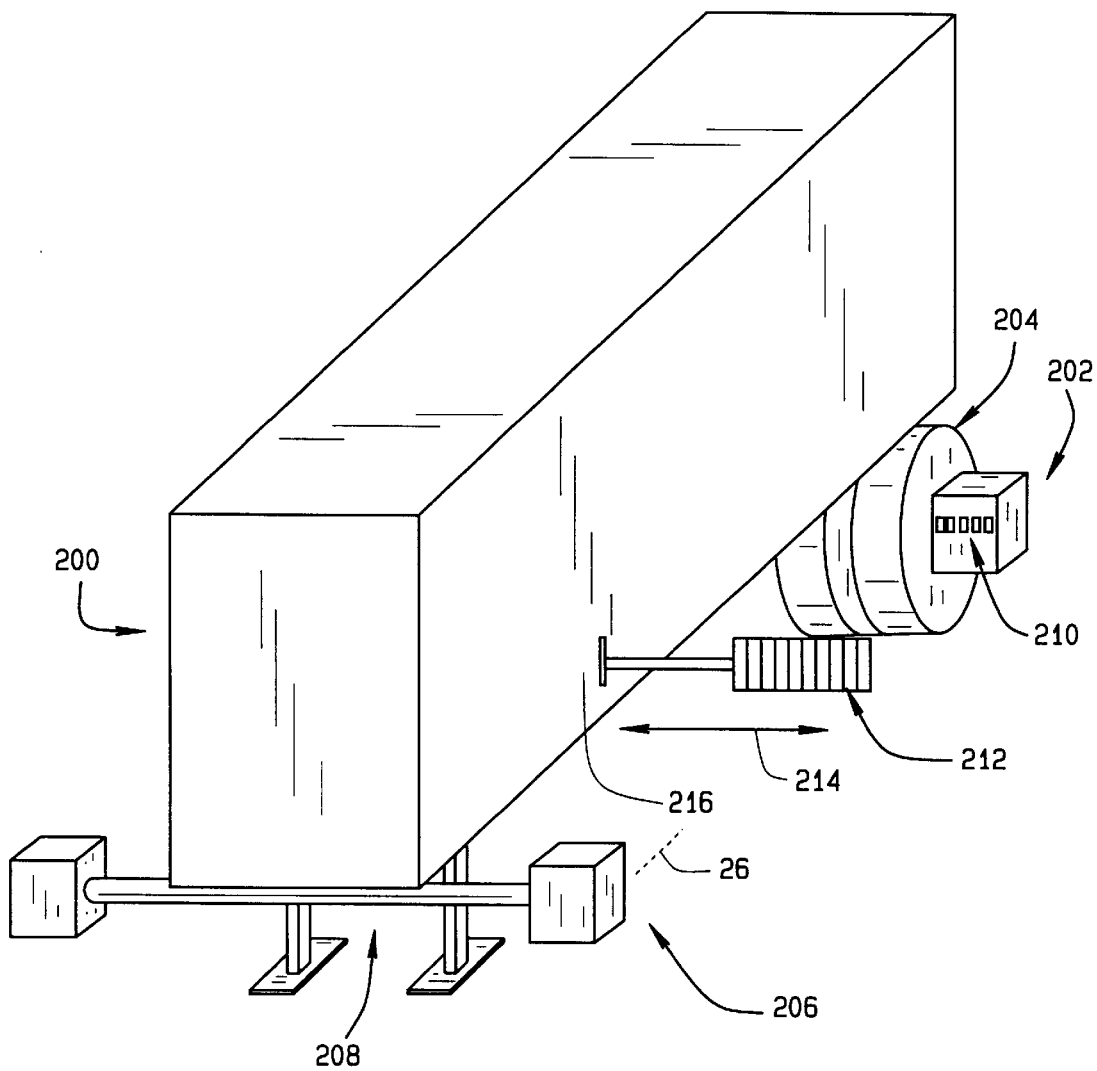
FIG. 4 is a perspective view of an alternative configuration for the present invention on a trailer.

FIG. 4 illustrates an alternative configuration of the present invention as it may be used for target identification and the measurement of body positions, such as on a trailer 200. In the configuration for this example, a sensor-emitter unit 202 is attached to the trailer's rear wheels 204 and another sensor unit 206 is attached to the trailer's kingpin 208. A first target 210 is defined by five emitters in the sensor-emitter unit 202, and a second target 212 is defined by five reflective segments located a distance 214 away from the trailer's side 216. Preferably, the second target 212 is attached to the trailer's side 216 and is located between the sensor units 202, 206. In addition to imaging and identifying the first target 210, sensor unit 206 also captures the second target 212 in a single image and distinguishes between the targets 210, 212. As exemplified by this configuration, the units are attached to the vehicle but do not always need to be attached to the vehicle at the wheels of the vehicle. Additionally, the targets may be placed at other locations within the line of sight 26 of the image sensor.

In view of the foregoing, it will be seen that the several advantages of the invention are achieved and attained. The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, the image sensor 24 may alternatively have a two-dimensional CCD array or even an integrated circuit detector array, such as a CMOS digital imaging circuit, rather than the linear CCD array in the preferred embodiment. Thus, the breadth and scope of the present invention should not be limited by any of the above-described exemplary embodiments, but should be defined only in accordance with the following claims appended hereto and their equivalents.

What is claimed is:

1. A system for identifying a target in a vehicle wheel alignment system, said target being viewed in the presence of noise, said system comprising:
   a first unit attached to a first wheel on a vehicle;
   a second unit attached to said vehicle and having a line of sight to said first unit;
   a target attached to said first unit, said target comprising a set of reference points having a known geometric relationship;
   an image sensor attached to said second unit for capturing an image of said target and of any noise points, said image sensor having an imaging element producing an image data-set representative of said image; and
   a processor operatively connected to said image sensor for receiving said image data-set therefrom, said processor including a program for determining measured relationships from said image data-set and comparing said measured relationships with said known geometric relationship to identify said target within said image and to distinguish said target from said noise points.

2. The system for identifying a target according to claim 1, wherein said target is comprised of at least four substantially collinear reference points having at least one known cross-ratio and wherein said processor computes at least one cross-ratio from said image data-set for comparison with said known cross-ratio.

3. The system for identifying a target according to claim 1, wherein said imaging element is a linear array.

4. The system for identifying a target according to claim 1, wherein said imaging element is a two-dimensional array.

5. The system for identifying a target according to claim 1, wherein said reference points are radiation emitters attached to said first unit.

6. The system for identifying a target according to claim 1, wherein said reference points arc target elements attached to said first unit.

7. The system for identifying a target according to claim 2, wherein said target further comprises at least one additional reference point having a substantially collinear relationship with said four substantially collinear reference points and wherein said target has at least four additional known cross-ratios.

8. The system for identifying a target according to claim 7, wherein said processor further computes at least four additional cross-ratios from said image data-set for comparison with said four additional known cross-ratios.

9. The system for identifying a target according to claim 2, wherein said image data-set includes at least one noise point that is not one of said at least four substantially collinear reference points.

10. A system for target identification in a vehicle wheel alignment system, said target being viewed in the presence of noise, said system comprising:
    a first unit attached to a first wheel on a vehicle;
    a second unit attached to said vehicle and having a line of sight to said first unit;
    a target attached to said first unit, said target comprising a set of at least four substantially collinear reference points having at least one known cross-ratio;
    an image sensor attached to said second unit for capturing an image of said target and of any noise points, and thereby producing an image data-set for said captured image, said image data-set comprising at least four image points respectively corresponding to said four substantially collinear reference points; and
    a processor operatively connected to said image sensor for receiving said image data-set therefrom, said processor including a program for computing at least one cross-ratio from said image data-set for comparison with said known cross-ratio to identify said target and to distinguish said target from said noise points.

11. The system for target identification according to claim 10, wherein said processor further comprises a memory, said memory storing said at least one known cross-ratio.

12. The system for target identification according to claim 10, wherein said target further comprises at least one additional substantially collinear reference point and wherein said target has at least four additional known cross-ratios.

13. The system for target identification according to claim 10, wherein said target further comprises a second set of at least four collinear reference points having a second known cross-ratio.

14. The system for target identification according to claim 10, wherein said second unit is attached to said vehicle at a second wheel.

15. The system for target identification according to claim 14, further comprising:
    a second target attached to said second unit, said second target comprising a second set of at least four substantially collinear reference points having a second known cross-ratio; and
    a second image sensor attached to said first unit for capturing an image of said second target and thereby producing an image data-set for said captured image.

16. The system for target identification according to claim 10, wherein said second unit is attached to said vehicle at a trailer kingpin.

17. The system for target identification according to claim 16, further comprising:
    a second target located between said first unit and said second unit and within a line of sight of said image sensor, said second target comprising a second set of at least four substantially collinear reference points having a second known cross-ratio.

18. A method for target identification in a vehicle wheel alignment system, said target being viewed in the presence of noise, said method comprising the steps of:
    attaching a first unit to a first wheel, said first unit including a target comprising a set of reference points having a known geometric relationship;
    attaching a second unit to a second wheel, said second unit including an image sensor having a line of sight to said target;

capturing an image of said target and of any noise points by said image sensor without synchronizing an on-state/off-state for said target, said captured image having an image data-set comprising a set of image points respectively corresponding to said set of reference points;

calculating a geometric relationship for said set of image points and comparing said calculated geometric relationship with said known geometric relationship to identify said target and to distinguish said target from said noise points only using said captured image and without any on-state/off-state cycling.

19. A method for target identification according to claim 18, wherein said calculating and comparing step further comprises the steps of:

selecting a set of four image points from said image data-set;

calculating for said geometric relationship a cross-ratio for said selected set of four image points;

comparing said calculated geometric relationship to said known geometric relationship to identify a portion of said image data-set corresponding to said target, said known geometric relationship being a known cross-ratio for substantially collinear reference points;

repeating said selecting, calculating, and comparing steps for different sets of four image points until said calculated cross-ratio corresponds to said known cross-ratio; and rejecting at least one noise point from said image data-set.

20. A method for target identification in a vehicle wheel alignment system, said target being viewed in the presence of noise, comprising the steps of:

attaching a first unit to a first wheel of a vehicle, said first unit including a target comprising a first set of at least four collinear reference points having at least one first known cross-ratio;

attaching a second unit to said vehicle, said second unit including an image sensor having a line of sight to said target;

capturing an image of said target and of any noise points by said image sensor, said captured image having an image data-set comprising a first set of image points respectively corresponding to said first set of at least four collinear reference points;

selecting a set of four image points from said image-data set;

calculating a cross-ratio for said selected set of image points; and comparing said calculated cross-ratio with said first known cross-ratio to identify said first set of image points within said image corresponding to said target and to distinguish said target from said noise points.

21. A method for target identification according to claim 20, wherein said capturing step is performed without synchronizing an on-state/off-state for said target.

22. A method for target identification according to claim 20, wherein said comparing step is performed without an on-state/off-state capture cycle.

23. A method for target identification according to claim 20, further comprising the steps of:

repeating said selecting, calculating, and comparing steps for different sets of four image points until said calculated cross-ratio corresponds to said known cross-ratio; and rejecting at least one noise point from said image data-set.

24. A method for target identification according to claim 20, further comprising the step of defining a range of correspondence for said calculated cross-ratio and said known cross-ratio.

25. A method for target identification according to claim 20, further comprising the step of determining said known cross-ratio during a calibration run.

26. A method for target identification according to claim 20, further comprising the steps of:

adding a second set of at least four collinear reference points within said line of sight of said image sensor, wherein said second set of collinear reference points have at least one second known cross-ratio that is different from said first known cross-ratio;

capturing an image of said second set of collinear reference points during said capture of said target, said captured image having an image data-set comprising said first set of image points and a second set of image points respectively corresponding to said second set of collinear reference points; and comparing said image data-set with said second known cross-ratio to respectively identify said second set of image points within said image and thereby identify a second portion of said image data-set corresponding to said second set of at least four collinear reference points.

27. A method for target identification according to claim 20, further comprising the steps of:

adding at least one additional reference point to said first set of collinear reference points; said one additional reference point having a collinear relationship with said four collinear reference points;

determining at least four additional cross-ratios for said first set of collinear reference points; and comparing said image data-set with said additional cross-ratios.

28. A method for target identification according to claim 27, further comprising the step of comparing the image data-set in an order of said first known cross-ratio and said additional cross-ratios.

29. A method for target identification according to claim 20, further comprising the step of attaching said second unit to said vehicle at a second wheel.

30. A method for target identification according to claim 20, further comprising the steps of:

attaching said second unit to said vehicle at a trailer kingpin;

locating a second target between said first unit and said second unit and within a line of sight of said image sensor, said second target comprising a second set of at least four substantially collinear reference points having a second known cross-ratio.

* * * * *